US012265340B2

(12) United States Patent
Mitani et al.

(10) Patent No.: US 12,265,340 B2
(45) Date of Patent: Apr. 1, 2025

(54) IMAGE-FORMING APPARATUS

(71) Applicant: CANON KABUSHIKI KAISHA, Tokyo (JP)

(72) Inventors: Takanori Mitani, Kanagawa (JP); Takao Kume, Kanagawa (JP); Satoshi Nishida, Kanagawa (JP); Isamu Takeda, Tokyo (JP); Kohei Okayasu, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/670,361

(22) Filed: May 21, 2024

(65) Prior Publication Data

US 2024/0302768 A1 Sep. 12, 2024

Related U.S. Application Data

(62) Division of application No. 18/156,951, filed on Jan. 19, 2023, now Pat. No. 12,019,380.

(30) Foreign Application Priority Data

Jan. 25, 2022 (JP) ................................ 2022-009162

(51) Int. Cl.
*G03G 15/08* (2006.01)
*G03G 9/093* (2006.01)
(Continued)

(52) U.S. Cl.
CPC ..... *G03G 15/0808* (2013.01); *G03G 9/09328* (2013.01); *G03G 15/0173* (2013.01);
(Continued)

(58) Field of Classification Search
None
See application file for complete search history.

(56) References Cited

U.S. PATENT DOCUMENTS

2016/0299446 A1* 10/2016 Kuroki ................. G03G 9/0825
2019/0377300 A1* 12/2019 Oka ................... G03G 15/5008
(Continued)

FOREIGN PATENT DOCUMENTS

JP 2005017472 A * 1/2005 ........... G03G 13/013

*Primary Examiner* — Sevan A Aydin
(74) *Attorney, Agent, or Firm* — Canon U.S.A., Inc. I.P. Division

(57) ABSTRACT

An image-forming apparatus includes first and second photosensitive drums, first and second image-forming portion including first and second development rollers configured to bear developers composed of first and second toner particles and organosilicon protrusions formed on surfaces of the first and second toner particles, an intermediate transfer member to which a developer image is to be transferred in first and second contact portions in contact with the first and second photosensitive drums, and a transfer member configured to transfer the developer image to a recording material in a transfer portion. The first contact portion is formed downstream of the transfer portion and upstream of the second contact portion in a movement direction of the surface of the intermediate transfer member. A protrusion formed on the second developer has a lower height than a protrusion formed on the first developer.

9 Claims, 5 Drawing Sheets

(51) Int. Cl.
*G03G 15/01* (2006.01)
*G03G 15/16* (2006.01)

(52) U.S. Cl.
CPC . *G03G 15/161* (2013.01); *G03G 2215/00177* (2013.01); *G03G 2215/00679* (2013.01)

(56) References Cited

U.S. PATENT DOCUMENTS

| | | | | |
|---|---|---|---|---|
| 2020/0209768 A1* | 7/2020 | Furui | .................. | G03G 9/09733 |
| 2020/0292955 A1* | 9/2020 | Matsunaga | .......... | G03G 9/0825 |
| 2023/0236530 A1* | 7/2023 | Yoshida | ............... | G03G 15/161 399/267 |
| 2024/0019791 A1* | 1/2024 | Inoue | .................. | G03G 9/08711 |

* cited by examiner

IMAGE-FORMING APPARATUS

CROSS-REFERENCE TO RELATED APPLICATION

This application is a Divisional of U.S. application Ser. No. 18/156,951, filed Jan. 19, 2023, which claims priority from Japanese Patent Application No. 2022-009162, filed Jan. 25, 2022, which is hereby incorporated by reference herein in its entirety.

BACKGROUND OF THE INVENTION

Field of the Invention

The present disclosure relates to an electrophotographic image-forming apparatus, such as a laser printer, a copying machine, or a facsimile machine.

Description of the Related Art

Typical electrophotographic apparatuses using toner include laser printers and copying machines. With recent rapid colorization, higher image quality has been required. One issue of electrophotography using toner is improvement in transferability. For example, when a toner image formed on a photosensitive member, which is an image-bearing member, is transferred to a transfer material in a transferring step, toner may remain on the photosensitive member. Toner remaining on the photosensitive member in the transferring step is referred to as untransferred toner. To improve the transferability of toner, such as to reduce the amount of untransferred toner, it is effective to reduce the adhesion strength of the toner to the photosensitive member. To reduce the adhesion strength of toner, an external additive may be attached to the surface of toner particles. In particular, it is known that there is a method for improving transfer efficiency by reducing physical adhesion strength between toner and a photosensitive member by a spacer effect of adding a spherical external additive with a large particle diameter.

Although this is effective as a method for improving transfer efficiency, a spherical external additive with a large particle diameter moves, is separated, or is buried, and cannot function as a spacer during image output for extended periods. Thus, it is difficult to consistently expect the effect of improving the transfer efficiency.

Japanese Patent Laid-Open No. 2009-36980 proposes a method of partially burying an external additive with a large particle diameter to suppress the movement and separation of the external additive. Japanese Patent Laid-Open No. 2008-257217 proposes a method for using a hemispherical external additive with a large particle diameter to suppress separation and burial.

However, Japanese Patent Laid-Open Nos. 2009-36980 and 2008-257217 have the following disadvantages. In image formation using an external additive as disclosed in Japanese Patent Laid-Open Nos. 2009-36980 and 2008-257217, when a plurality of color toners on an intermediate transfer member are collectively transferred to a recording material, transferability may become insufficient as the specification of the toners advances.

SUMMARY OF THE INVENTION

The present disclosure reduces the occurrence of untransferred toner for extended periods when a plurality of color toners transferred to an intermediate transfer member are transferred to a recording material.

An image-forming apparatus according to the present disclosure includes: a first image-forming portion including a rotatable first image-bearing member and a rotatable first developer-bearing member configured to bear a first developer composed of a first toner particle and an organosilicon protrusion formed on a surface of the first toner particle, configured to come into contact with the first image-bearing member and form a first developing portion, and configured to supply the first developer to a surface of the first image-bearing member to form a first developer image in the first developing portion; a second image-forming portion including a rotatable second image-bearing member and a rotatable second developer-bearing member configured to bear a second developer composed of a second toner particle and an organosilicon protrusion formed on a surface of the second toner particle, configured to come into contact with the second image-bearing member and form a second developing portion, and configured to supply the second developer to a surface of the second image-bearing member to form a second developer image in the second developing portion; an intermediate transfer member configured to come into contact with the first image-bearing member and form a first contact portion and to come into contact with the second image-bearing member and form a second contact portion, wherein the first developer image is transferred to the intermediate transfer member in the first contact portion, and the second developer image is transferred to the intermediate transfer member in the second contact portion; and a transfer member configured to come into contact with the intermediate transfer member, form a transfer portion, and transfer the first developer image and the second developer image formed on a surface of the intermediate transfer member to a recording material in the transfer portion, wherein the surface of the intermediate transfer member is movable, the first image-forming portion and the second image-forming portion are arranged such that the first contact portion is formed downstream of the transfer portion and upstream of the second contact portion in a movement direction of the surface of the intermediate transfer member, and the protrusion of the second developer has a lower height than the protrusion of the first developer.

Further features of the present disclosure will become apparent from the following description of exemplary embodiments with reference to the attached drawings.

DESCRIPTION OF THE EMBODIMENTS

Embodiments of the present disclosure are described in detail below on the basis of exemplary embodiments with reference to the accompanying drawings. However, the dimensions, materials, shapes, relative arrangements, and the like of components described in these embodiments should be appropriately changed depending on the structures and various conditions of apparatuses to which the present disclosure is applied. Thus, the scope of the present disclosure is not limited to the following embodiments.

1. Image-Forming Apparatus

Figure 1:
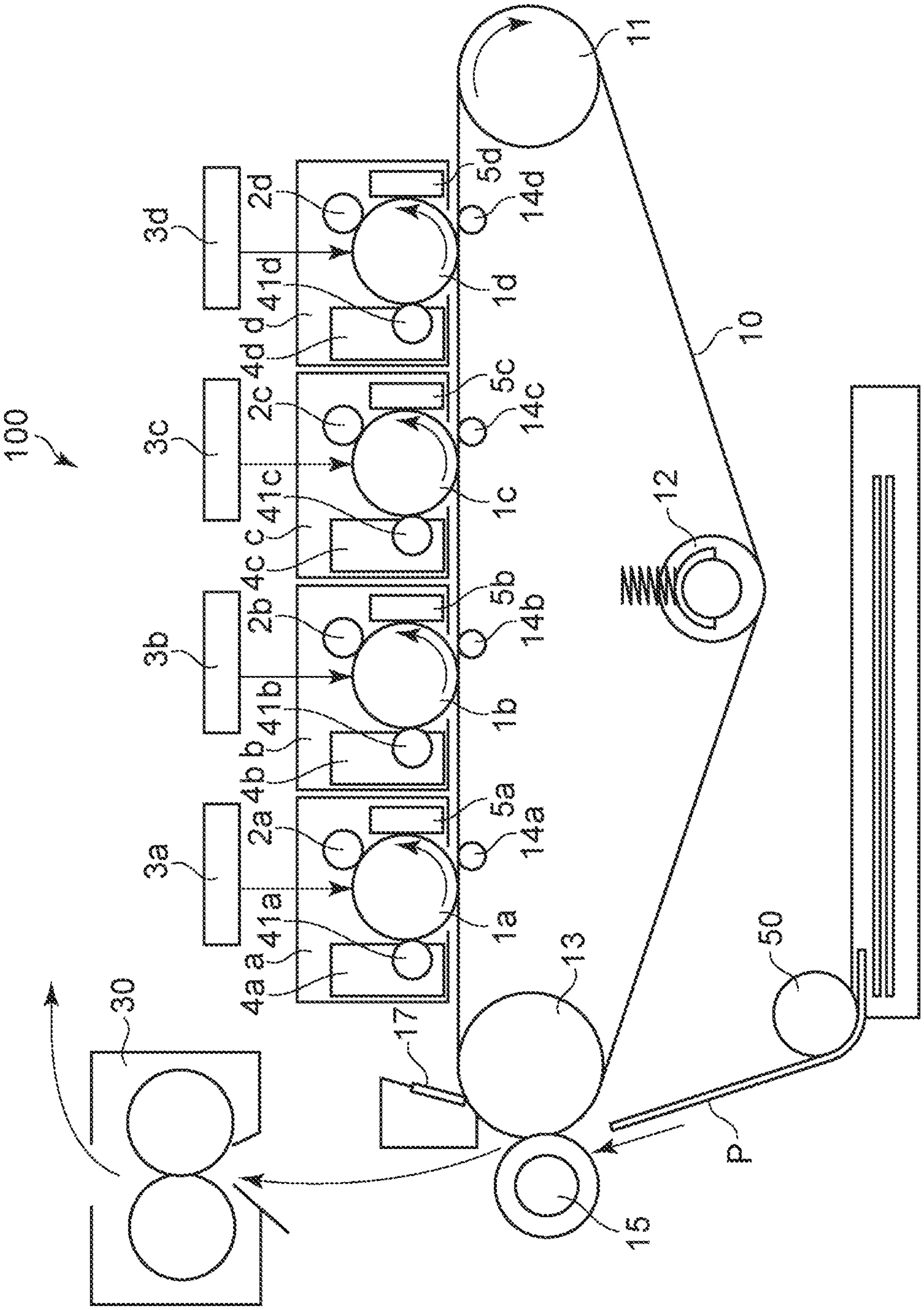
FIG. 1 is a schematic view of an image-forming apparatus according to Exemplary Embodiment 1.

FIG. 1 is a schematic view of an example of a color-image-forming apparatus. The structure and operation of the image-forming apparatus according to the present embodiment are described with reference to FIG. 1. An image-forming apparatus 100 according to the present embodiment is a tandem printer including image-forming stations a to d, which are image-forming portions. A first image-forming station a forms a yellow (Y) image, a second image-forming station b forms a magenta (M) image, a third image-forming station c forms a cyan (C) image, and a fourth image-forming station d forms a black (Bk) image.

The structures of the image-forming stations are the same except for the color of toner contained therein, and the first image-forming station a is described below. When no particular distinction is required, Y, M, C, and K are collectively described without a to d.

The first image-forming station a includes a drum-shaped electrophotographic photosensitive member (hereinafter referred to as a photosensitive drum) 1*a*, a charging roller 2*a* as a charging device, an exposure unit 3*a*, a development unit 4*a*, and a cleaning device 5*a* as a cleaning member.

The photosensitive drum 1*a* is an image-bearing member that is driven to rotate by a photosensitive drum drive unit 110 at a circumferential velocity (process speed) of 150 mm/s in the direction of the arrow and that bears a toner image. The photosensitive drum 1*a* includes a photosensitive layer and a surface layer on an aluminum pipe with a diameter Φ of 20 mm. The surface layer is a thin polyarylate layer with a thickness of 20 μm.

Figure 2:
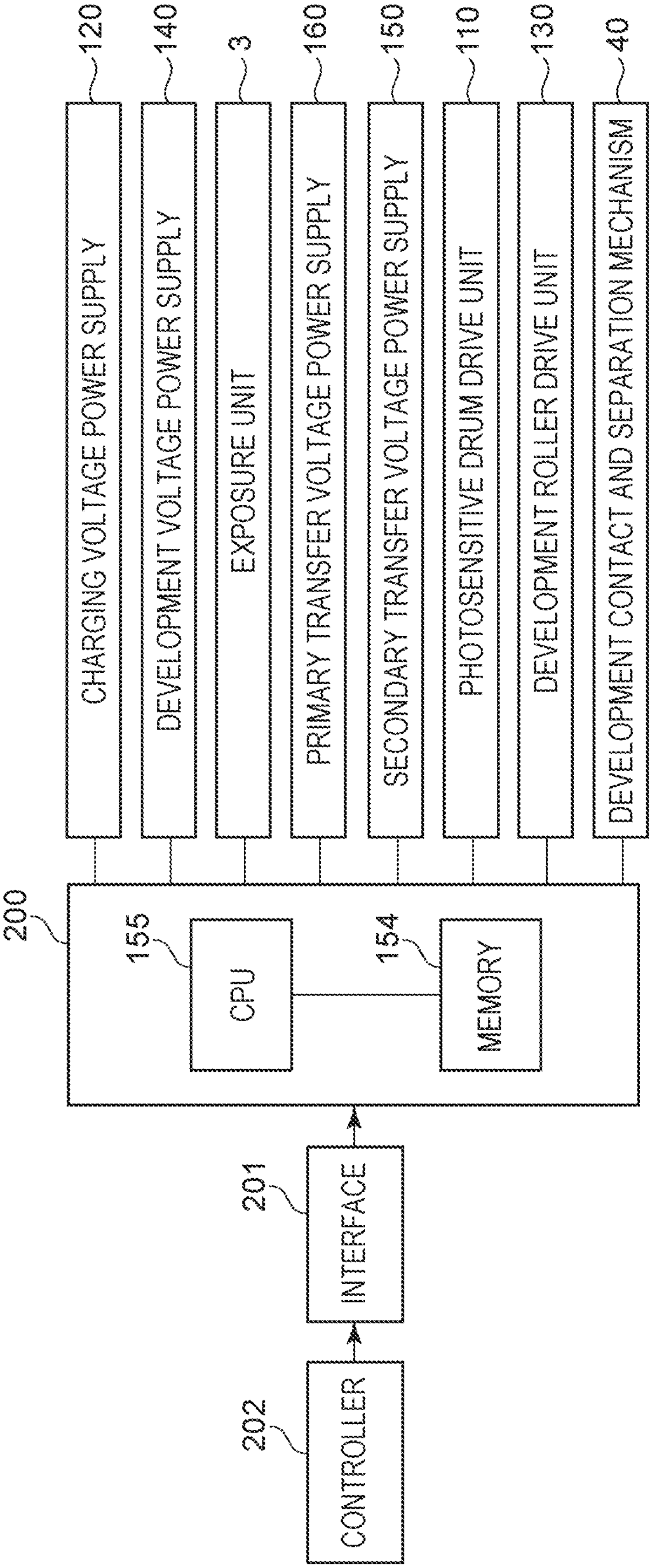
FIG. 2 is a control block diagram in Exemplary Embodiment 1.

When a control unit 200 in FIG. 2 receives an image signal via a controller 202 and an interface 201, an image-forming operation is started, and the photosensitive drum 1*a* is driven to rotate. In the rotation process, the photosensitive drum 1*a* is uniformly charged to a predetermined potential with a predetermined polarity (the normal polarity is negative polarity in the present embodiment) by the charging roller 2*a* and is exposed to light emitted from the exposure unit 3*a* in accordance with the image signal. This forms an electrostatic latent image corresponding to a yellow component image of a target color image. The electrostatic latent image is then developed by the development unit (yellow development unit) 4*a* at a development position and is visualized as a yellow toner image.

The charging roller 2*a* serving as a charging member is in contact with the surface of the photosensitive drum 1*a* in a charging portion at a predetermined pressure contact force and is driven to rotate with the photosensitive drum 1*a* by friction with the surface of the photosensitive drum 1*a*. A predetermined direct-current voltage is applied to the rotating shaft of the charging roller 2*a* from a charging voltage power supply 120 in the image-forming operation. In the image-forming operation, the control unit 200 applies a direct-current voltage of −1050 V as a charging voltage to the rotating shaft of the charging roller 2*a* to charge the surface of the photosensitive drum 1*a* to a predetermined potential of −500 V. The surface potential of the photosensitive drum 1*a* was measured with a surface electrometer Model 344 manufactured by Trek Inc. The surface potential −500 V of the photosensitive drum 1*a* is the surface potential of the photosensitive drum 1*a* in a non-image-forming period, which is the dark potential (Vd) at which the toner image is not developed.

The exposure unit 3*a* includes a laser driver, a laser diode, a polygon mirror, and an optical lens system. As illustrated in FIG. 2, an exposure unit 3 receives a time-series electric digital pixel signal of image information that is input from a controller 202 to the control unit 200 via an interface 201 and is subjected to image processing. In the present exemplary embodiment, the exposure level is adjusted so that the image-forming potential Vl of a photosensitive drum 1 in an electrostatic latent image portion exposed by the exposure unit 3*a* is −100 V. The image-forming potential is also referred to as a bright potential.

The development unit 4*a* includes a development roller 41*a* as a developing member (developer-bearing member) and a nonmagnetic one-component developer composed of toner and transfer promoting particles described later. The development unit 4*a* is a development device for performing a development operation on the photosensitive drum 1 to develop the electrostatic latent image as a toner image and is a developer storage portion for storing a developer. As illustrated in FIG. 2, the development unit 4*a* and an image-forming apparatus main body 100 include a contact and separation mechanism 40 for controlling the contact and separation (development separation) state between the development roller 41*a* and the photosensitive drum 1*a*. The control unit 200 performs contact and separation between the development roller 41*a* and the photosensitive drum 1*a* in accordance with the image-forming operation or another operation. When the development roller 41*a* is in contact with the photosensitive drum 1*a*, the pressing force of the development roller 41*a* is 200 gf. A development nip portion, which is a contact portion between the development roller 41*a* and the photosensitive drum 1*a*, has a width of 2 mm in the rotational direction of the photosensitive drum 1*a* and a width of 220 mm in the longitudinal direction of the photosensitive drum 1*a*. The development roller 41*a* is driven to rotate at a surficial moving speed (hereinafter referred to as a circumferential velocity) of 180 mm/s by a development roller drive unit 130 in the forward direction with the surface movement direction of the photosensitive drum 1*a* such that the circumferential velocity in the development nip portion is 120% of the circumferential velocity of the photosensitive drum 1*a*. Thus, the development roller 41*a* is rotated at a surficial moving speed 1.2 times higher than the surficial moving speed of the photosensitive drum 1.

When the development roller 41*a* is in contact with the photosensitive drum 1*a* in the image-forming operation, the control unit 200 controls a development voltage power supply 140 to apply a direct-current voltage of −300 V as a development voltage Vdc to the metal core of the development roller 41*a*. In the image-forming period, toner borne on the development roller 41*a* is developed in an image-forming potential Vl portion of the photosensitive drum 1*a* by an electrostatic force generated by a potential difference between the development voltage Vdc=−300 V and the image-forming potential Vl=−100 V of the photosensitive drum 1*a*.

In the following description, with respect to potential and applied voltage, a large absolute value on the negative polarity side (for example, −1000 V with respect to −500 V) is referred to as a high potential, and a small absolute value on the negative polarity side (for example, −300 V with respect to −500 V) is referred to as a low potential. This is because toner with negative chargeability in the present exemplary embodiment is considered as a reference.

The voltage in the present exemplary embodiment is expressed as a potential difference from the ground potential (0 V). Thus, the development voltage Vdc=−300 V is interpreted as a potential difference of −300 V from the ground potential due to the development voltage applied to the metal core of the development roller 41*a*. This also applies to the charging voltage, the transfer voltage, and the like.

The control unit 200 is described below. FIG. 2 is a control block diagram showing a schematic control mode of a principal part of the image-forming apparatus 100 in the present exemplary embodiment. The controller 202 exchanges various electrical information with a host apparatus and controls the image-forming operation of the image-forming apparatus 100 in an integrated manner in the control unit 200 through the interface 201 in accordance with a predetermined control program or reference table. The control unit 200 includes a CPU 155 as a central element for performing various arithmetic processing and a memory 154, such as a memory element ROM or RAM. The RAM stores a detection result of a sensor, a count result of a counter, and a calculation result. The ROM stores a control program and a data table obtained in advance by an experiment or the like. The control unit 200 is coupled to a control object, sensor, counter, and the like in the image-forming apparatus 100. The control unit 200 exchanges various electrical information signals and controls the timing of driving each unit to control a predetermined image-forming sequence. For example, the control unit 200 controls the exposure level and the voltages applied by the charging voltage power supply 120, the development voltage power supply 140, the exposure unit 3, a primary transfer voltage power supply 160, and a secondary transfer voltage power supply 150. The control unit 200 also controls the photosensitive drum drive unit 110, the development roller drive unit 130, and the development contact and separation mechanism 40. The image-forming apparatus 100 forms an image on a recording material P on the basis of an electrical image signal input from a host apparatus to the controller 202. The host apparatus may be an image reader, a personal computer, a facsimile, or a smartphone.

The toner in the present exemplary embodiment is a nonmagnetic toner with negative chargeability produced by a suspension polymerization method, has a volume-average particle diameter of 7.0 μm, and is negatively charged when borne on the development roller 41*a*. The volume-average particle diameter of toner was measured with a laser diffraction particle size distribution measuring instrument LS-230 manufactured by Beckman Coulter, Inc. Toner is described in detail later.

An intermediate transfer belt 10 serving as an intermediate transfer member is stretched by a plurality of stretching members 11, 12, and 13 and is driven to rotate at the same circumferential velocity as the photosensitive drum 1*a* in an opposing portion in contact with the photosensitive drum 1*a* in the circumferential direction. A direct-current voltage of 200 V is applied from the primary transfer voltage power supply 160 to a primary transfer roller 14*a* serving as a primary transfer member at the time of primary transfer in the image-forming operation. The yellow toner image formed on the photosensitive drum 1*a* is electrostatically transferred onto the intermediate transfer belt 10 while passing through a primary transfer portion, which is a contact portion between the photosensitive drum 1*a* and the primary transfer roller 14*a* with the intermediate transfer belt 10 interposed therebetween.

The primary transfer roller 14*a* is a Φ6-mm cylindrical metal roller and is made of nickel-plated stainless steel. The primary transfer roller 14*a* is offset 8 mm downstream of the center position of the photosensitive drum 1*a* in the movement direction of the intermediate transfer belt 10, and the intermediate transfer belt 10 is wound around the photosensitive drum 1*a*. The primary transfer roller 14*a* is located at a position higher by 1 mm than the horizontal plane formed by the photosensitive drum 1*a* and the intermediate transfer belt 10 to ensure the amount of winding of the intermediate transfer belt 10 around the photosensitive drum 1*a*. The primary transfer roller 14*a* presses the intermediate transfer belt 10 at a force of approximately 200 gf. The primary transfer roller 14*a* is driven to rotate by the rotation of the intermediate transfer belt 10. The primary transfer roller 14*b* in the second image-forming station b, the primary transfer roller 14*c* in the third image-forming station c, and the primary transfer roller 14*d* in the fourth image-forming station d have the same structure as the primary transfer roller 14*a*.

A magenta toner image of a second color, a cyan toner image of a third color, and a black toner image of a fourth color are formed in the same manner in the second, third, and fourth image-forming stations b, c, and d and are sequentially transferred and superimposed on the intermediate transfer belt 10. Thus, a composite color image corresponding to the target color image is formed. Primary-transfer remaining toner on the surfaces of the photosensitive drums 1*a*, 1*b*, 1*c*, and 1*d* after the primary transfer is removed by a cleaning blade (not shown) provided in the cleaning devices 5*a*, 5*b*, 5*c*, and 5*d*. This allows the photosensitive drums 1*a*, 1*b*, 1*c*, and 1*d* to prepare for the next image formation.

The four color toner images on the intermediate transfer belt 10 are collectively transferred to the surface of the recording material P fed by a sheet feeding unit 50 in a secondary transferring step in which the toner images pass through a secondary transfer nip portion formed by the intermediate transfer belt 10 and a secondary transfer roller 15 serving as a secondary transfer member. The secondary transfer roller 15 is in contact with the intermediate transfer belt 10 at a pressure of 50 N and forms the secondary transfer nip portion. When the secondary transfer roller 15 is driven to rotate by the intermediate transfer belt 10 and the toner on the intermediate transfer belt 10 is secondarily transferred to the recording material P, such as a paper sheet, a voltage of 1500 V is applied by the secondary transfer voltage power supply 150.

The recording material P bearing the four color toner images is introduced into a fixing unit 30. The four color toners are melted and mixed by heating and pressurizing by the fixing unit 30 and are fixed to the recording material P. Toner remaining on the intermediate transfer belt 10 after the secondary transfer is removed by an intermediate transfer belt cleaning device 17 serving as an intermediate transfer member cleaning device.

The intermediate transfer belt cleaning device 17 has a cleaning blade or the like that comes into contact with the outer peripheral surface of the intermediate transfer belt 10, that scrapes off the toner remaining on the intermediate transfer belt 10, and that collects the toner in the intermediate transfer belt cleaning device 17. The intermediate transfer belt cleaning device 17 is located downstream of a secondary transfer portion of the intermediate transfer belt 10 in the rotational direction of the intermediate transfer belt 10 to collect the toner adhering to the intermediate transfer belt 10.

A full-color print image is formed by this operation.

2. Toner

The developer used in the present exemplary embodiment is described in detail below.

All four color developers in the present exemplary embodiment are toner particles each containing a toner base particle containing a release agent and an organosilicon polymer on the surface of the toner base particle. The organosilicon polymer has a T3 unit structure represented by $R—Si(O_{1/2})_3$, wherein R denotes an alkyl or phenyl group having 1 to 6 carbon atoms, and forms a protrusion 64 on the surface of the toner base particle. The protrusion is in surface contact with the surface of the toner base particle, and the surface contact can be expected to have a significant effect of suppressing the movement, separation, and burying of the protrusion.

Figure 3:
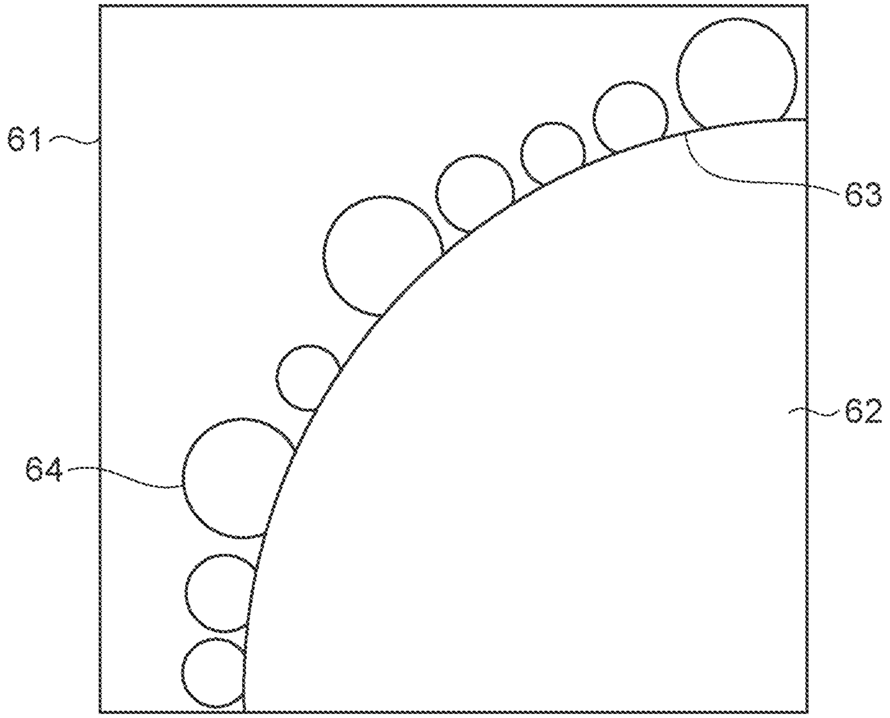
FIG. 3 is a schematic view of a toner surface in Exemplary Embodiment 1.
Figure 4:
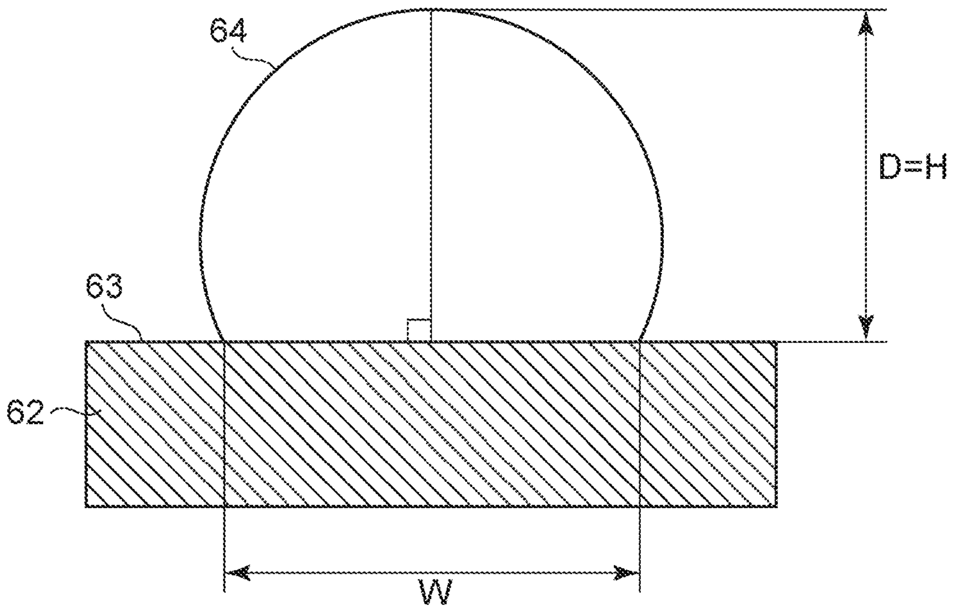
FIG. 4 is a schematic view of a protrusion shape on a toner surface in Exemplary Embodiment 1.
Figure 5:
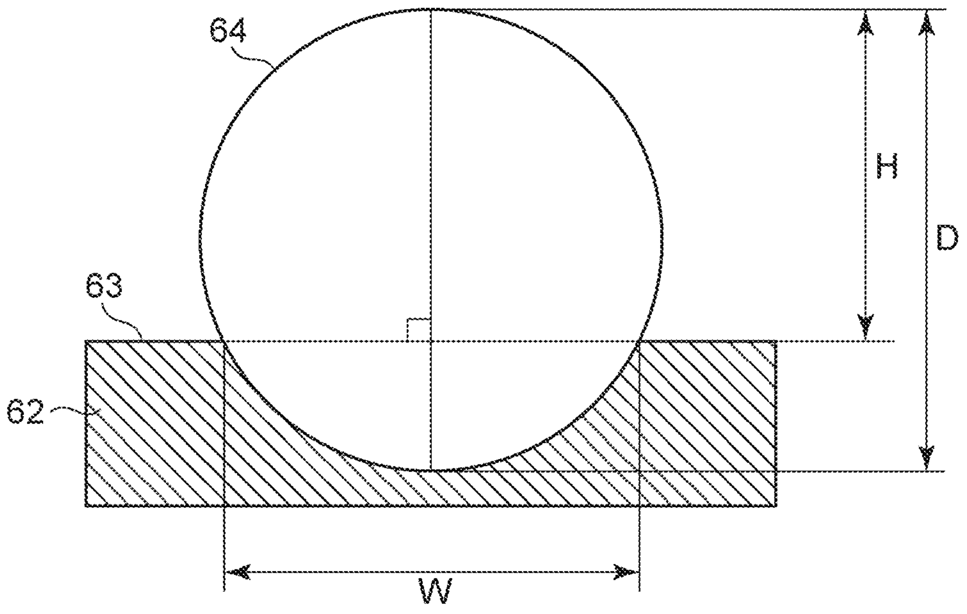
FIG. 5 is a schematic view of a protrusion shape on a toner surface in Exemplary Embodiment 1.

The degree of surface contact is described with reference to the schematic views of the protrusion 64 illustrated in FIGS. 3, 4, and 5. In FIG. 3, 61 is a cross-sectional image of a toner particle in which approximately one fourth of the toner particle can be seen, 62 is the toner particle, and 63 is the surface of the toner base particle. A cross section of the toner particle 62 can be observed with a scanning transmission electron microscope (hereinafter also referred to as STEM) described later. A cross-sectional image of a toner is observed, and a line is drawn along the peripheral surface of the surface of the toner base particle 63. The cross-sectional image is converted to a horizontal image on the basis of the line along the circumference. In the horizontal image, the length of a line along the circumference in a portion where a protrusion and the toner base particle form a continuous interface is defined as a protrusion width W. The maximum length of the protrusion normal to the protrusion width W is defined as a protrusion diameter D. The length from the top of the protrusion to the line along the circumference in the line segment forming the protrusion diameter D is defined as a protrusion height H. In FIG. 4, the protrusion diameter D and the protrusion height H are the same. In FIG. 5, the protrusion diameter D is larger than the protrusion height H.

In primary transfer and secondary transfer of only one color toner, the average value of the protrusion heights H preferably ranges from 5 to 300 nm. As the number average of the protrusion heights H increases, the adhesion strength decreases due to a spacer effect between the surface of the toner base particle and a transfer member. Setting the average value of the protrusion heights H to 5 nm or more can improve primary transferability and secondary transferability in one color toner. When the number average of the protrusion heights H is more than 300 nm, however, this tends to result in the toner with poor flowability and an uneven image. As described later in Exemplary Embodiment 2, Bk toner in the fourth station not applied to the intermediate transfer belt 10 may have no protrusion, because the spacer effect does not need to be taken into consideration, and may have improved transferability using an external additive or the like. In the present exemplary embodiment, the number average of the protrusion heights H is the arithmetic mean of the measured values of the protrusion heights H calculated for the number of the protrusions 64 arbitrarily selected.

In secondary transfer of two or more color toners, a large amount of toner is loaded, and the secondary transferability is lower than that of one color toner. Thus, the number average of the protrusion heights H of the first toner to be primarily transferred among the toners to be primarily transferred on the intermediate transfer belt 10 is larger, preferably by 5 nm or more, more preferably by 10 nm or more, than the number average of the protrusion heights H of the last toner to be primarily transferred. This can make the adhesion strength between the toner and the intermediate transfer belt 10 sufficiently lower than the adhesion strength between the toner and the recording material P and improve the secondary transferability when two or more color toners on the intermediate transfer belt 10 are secondarily transferred to the recording material P at a time. In the present exemplary embodiment, the ratio of the number average H2 of the protrusion heights H of the last toner to be primarily transferred to the number average H1 of the protrusion heights H of the first toner to be primarily transferred is preferably $0 \leq H2/H1 < 1$, more preferably $0 \leq H2/H1 < 0.92$, still more preferably $0 \leq H2/H1 < 0.83$.

The adhesion rate of protrusions to a toner base of toner first transferred is 85.0% or more, preferably 90.0% or more. When the adhesion rate of protrusions to a toner base is 85.0% or more, the organosilicon polymer in the surface layer is less likely to be peeled or separated. Thus, even in long-term use, it is possible to reduce an increase in the adhesion strength between the toner and the intermediate transfer belt 10 when two or more color toners are collectively transferred to the recording material P. The adhesion strength between the toner and the intermediate transfer belt 10 is maintained to be sufficiently lower than the adhesion strength between the toner and the recording material P. Although the protrusion 64 is formed of the organosilicon polymer in the present exemplary embodiment, the protrusion 64 may be formed by another method, provided that the adhesion rate described above can be achieved. For example, a particle, such as an organosilicon particle, may be partially buried in the surface of the base particle, as illustrated in FIG. 5. In such a case, the particle may be rapidly buried in the latter half of long-term use, and the protrusion height may decrease. Thus, as illustrated in FIG. 4, the protrusion 64 can be in surface contact with the surface of the toner base particle 63, and the protrusion 64 of the present exemplary embodiment has this shape. A measurement method and the definition of the adhesion rate are described later.

The surface of the toner is observed with a scanning electron microscope to acquire a backscattered electron image of a 1.5-μm square surface of the toner. When an image is binarized such that an organosilicon polymer portion in the backscattered electron image becomes a bright portion, the area percentage of the bright portion area of the image to the total area of the image (hereinafter also referred to simply as the area percentage of the bright portion area) ranges from 30.0% 75.0%. The area percentage of the bright portion area of the image preferably ranges from 35.0% to 70.0%.

A higher area percentage of the bright portion area indicates a higher presence ratio of the organosilicon polymer on the surface of the toner base particle. When the area percentage of the bright portion area is more than 75.0%, the presence ratio of a component derived from the toner base particle on the surface of the toner base particle is decreased, the release agent is less likely to exude from the toner base particle, and a thin paper sheet is likely to be wound around the fixing unit (separation failure) during low-temperature fixation. On the other hand, when the area percentage of the bright portion area of the image is less than 30.0%, the presence ratio of a component derived from the toner base particle on the surface of the toner base particle is increased. This increases the area of a component derived from the toner base particle exposed to the surface of the toner base particle and reduces the effect of improving the transferability of the primary transfer and the secondary transfer due to the protrusion height. The area percentage of the bright portion area of the image is hereinafter also referred to as the coverage of the surface of the toner base particle with the organosilicon polymer. A method for measuring the area percentage of the bright portion area, that is, the coverage is described later.

An external additive, such as a fluidizer or a cleaning aid, may be added to toner to improve flowability, chargeability, cleaning performance, and the like.

Examples of the external additive include fine inorganic oxide particles, such as fine silica particles, fine alumina particles, and fine titanium oxide particles; fine inorganic stearate compound particles, such as fine aluminum stearate particles and fine zinc stearate particles; and fine inorganic titanate compound particles, such as strontium titanate and zinc titanate. These may be used alone or in combination. These fine inorganic particles can be glossed with a silane coupling agent, a titanate coupling agent, a higher fatty acid, silicone oil, or the like to improve heat-resistant storage stability and environmental stability. The external additive preferably has a BET specific surface area in the range of 10 to 450 $m^2/g$.

The BET specific surface area can be determined by a low-temperature gas adsorption method based on a dynamic constant pressure method according to a BET method (possibly a BET multipoint method). For example, nitrogen gas can be adsorbed on the surface of a specimen in a specific surface area measuring apparatus (trade name: Gemini 2375 Ver. 5.0 manufactured by Shimadzu Corporation) to determine the BET specific surface area ($m^2/g$) by the BET multipoint method.

The total amount of these external additives to be added ranges from 0.05 to 5 parts by mass, preferably 0.1 to 3 parts by mass, per 100 parts by mass of toner. Various external additives may be used in combination.

3. Method for Measuring Physical Properties of Toner

Various measurement methods are described below.

Method for Observing Cross Section of Toner with Scanning Transmission Electron Microscope (STEM)

A cross section of toner to be observed with a scanning transmission electron microscope (STEM) is prepared as described below.

The procedure of preparing a cross section of toner is described below. When toner contains externally added organic or inorganic fine particles, the organic or inorganic fine particles are removed by the following method or the like to prepare a specimen.

160 g of sucrose (manufactured by Kishida Chemical Co., Ltd.) is dissolved in 100 mL of ion-exchanged water in a vessel in hot water to prepare a concentrated sucrose solution. A centrifugation tube (volume: 50 mL) is charged with 31 g of the concentrated sucrose solution and 6 mL of Contaminon N (a 10% by mass aqueous neutral detergent for cleaning precision measuring instruments composed of a nonionic surfactant, an anionic surfactant, and an organic builder, pH 7, manufactured by Wako Pure Chemical Industries, Ltd.). 1.0 g of toner is added to the centrifugation tube, and agglomerates of toner are triturated with a spatula. The centrifugation tube is shaken in a shaker (AS-1N sold by As One Corporation) at 300 strokes per minute (spm) for 20 minutes.

After shaking, the solution is transferred to a glass tube for a swing rotor (50 mL) and is centrifuged in a centrifugal separator (H-9R manufactured by Kokusan Co., Ltd.) at 3500 rpm for 30 minutes. Toner particles are separated from an external additive by this operation. Sufficient separation of the toner particles from the aqueous solution is visually inspected, and the toner particles in the top layer are collected with a spatula. The collected toner particles are filtered through a vacuum filter and are dried in a dryer for one hour or more to prepare a test specimen. This operation is performed multiple times to prepare a required amount of test specimen.

Whether a protrusion contains an organosilicon polymer is determined also by elemental analysis using energy dispersive X-ray analysis (EDS).

A single layer of toner is spread on a cover glass (square cover glass, square No. 1, manufactured by Matsunami Glass Ind., Ltd.). An osmium (Os) plasma coater (OPC80T manufactured by Filgen, Inc.) is used to form an Os film (5 nm) and a naphthalene film (20 nm) as protective films on the toner. A PTFE tube (outer diameter: 3 mm (inner diameter: 1.5 mm)×3 mm) is then filled with a photocurable resin D800 (JEOL Ltd.), and the cover glass is gently placed on the tube in such a direction that the toner comes into contact with the photocurable resin D800. In this state, the resin is irradiated with light to be cured, and the cover glass and the tube are then removed to form a cylindrical resin in which the toner is embedded in the outermost surface. The outermost surface of the cylindrical resin is cut with an ultrasonic ultramicrotome (Leica, UC7) at a cutting speed of 0.6 mm/s in the length corresponding to the radius of the toner (for example, 4.0 μm when the weight-average particle diameter (D4) is 8.0 μm) to expose a cross section of the central portion of the toner.

The resin is then cut to a film thickness of 100 nm to prepare a thin sample of the cross section of the toner.

A cross section of the central portion of the toner can be prepared by cutting in such a manner.

The scanning transmission electron microscope (STEM) was JEM-2800 manufactured by JEOL Ltd. The probe size of the STEM is 1 nm, and an image with an image size of 1024×1024 pixels is acquired. The Contrast and Brightness of the Detector Control panel of a bright-field image are adjusted to 1425 and 3750, respectively. The Contrast, Brightness, and Gamma of the Image Control panel is adjusted to 0.0, 0.5, and 1.00, respectively. An image is then acquired. An image of one fourth to one half of the circumference of the cross section of a toner particle as illustrated in FIG. 3 is acquired at an image magnification of 100,000 times. The acquired STEM image is subjected to image analysis using image-processing software (Image J (available from https://imagej.nih.gov/ij/)) to measure the protrusion 64 containing the organosilicon polymer. Thirty protrusions 64 arbitrarily selected from the STEM image are measured. Whether the protrusion 64 contains the organosilicon polymer is examined by a combination of a scanning electron microscope (SEM) and elemental analysis using energy dispersive X-ray analysis (EDS). First, a line is drawn along the circumference of the toner base particle 63 using a line drawing tool (select Segmented line on the Straight tab). When a protrusion 64 of the organosilicon polymer is embedded in the toner base particle 63, lines are smoothly connected on the assumption that the protrusion is not embedded. Conversion to a horizontal image is performed on the basis of the line (select Selection on the Edit tab, change the line width to 500 pixels in properties, select Selection on the Edit tab, and perform Straightener). In the horizontal image, one of the protrusions 64 containing the organosilicon polymer is measured as described below. The length of a line along the circumference in a portion where the protrusion 64 and the toner base particle 63 form a continuous interface is defined as a protrusion width w. The maximum length of the protrusion 64 normal to the protrusion width w is defined as a protrusion diameter D. The length from the top of the protrusion 64 to the line along the circumference in the line segment forming the protrusion diameter D is defined as a protrusion height H. In the present exemplary embodiment, the measurement is performed for arbitrarily selected 30 protrusions 64, and the arithmetic mean of measured values is taken as the number average of the protrusion heights H. The number average may be calculated by another method. For example, the number of protrusions is not necessarily 30, and the number average is not necessarily the arithmetic mean. Furthermore, for example, the height of 80% of the protrusions from the lowest of the protrusions of 30 nm or more may be defined as the number average. This is because the protrusions of less than 30 nm contributes little to the adhesion strength.

Method for Calculating Area Percentage of Bright Portion Area in 1.5-μm Square Backscattered Electron Image of Toner Surface For the area percentage of a bright portion area, the surface of toner is observed with a scanning electron microscope. A backscattered electron image of a 1.5-μm square surface of the toner is acquired. An image is then binarized such that an organosilicon polymer portion in the backscattered electron image becomes a bright portion, and the ratio of the bright portion area of the image to the total area of the image is determined. When toner contains externally added organic or inorganic fine particles, the organic or inorganic fine particles are removed by the following method or the like to prepare a specimen.

160 g of sucrose (manufactured by Kishida Chemical Co., Ltd.) is dissolved in 100 mL of ion-exchanged water in a vessel in hot water to prepare a concentrated sucrose solution. A centrifugation tube (volume: 50 mL) is charged with 31 g of the concentrated sucrose solution and 6 mL of Contaminon N (a 10% by mass aqueous neutral detergent for cleaning precision measuring instruments composed of a nonionic surfactant, an anionic surfactant, and an organic builder, pH 7, manufactured by Wako Pure Chemical Industries, Ltd.). 1.0 g of toner is added to the centrifugation tube, and agglomerates of toner are triturated with a spatula. The centrifugation tube is shaken in a shaker (AS-1N sold by As One Corporation) at 300 strokes per minute (spm) for 20 minutes.

After shaking, the solution is transferred to a glass tube for a swing rotor (50 mL) and is centrifuged in a centrifugal separator (H-9R manufactured by Kokusan Co., Ltd.) at 3500 rpm for 30 minutes. Toner particles are separated from an external additive by this operation. Sufficient separation of the toner particles from the aqueous solution is visually inspected, and the toner particles in the top layer are collected with a spatula. The collected toner particles are filtered through a vacuum filter and are dried in a dryer for one hour or more to prepare a test specimen. This operation is performed multiple times to prepare a required amount of test specimen.

Whether the protrusions 64 contain an organosilicon polymer is determined also by using energy dispersive X-ray analysis (EDS) described later.

The SEM apparatus and observation conditions are as follows:

Apparatus used: ULTRA PLUS manufactured by Carl Zeiss Microscopy GmbH

Accelerating voltage: 1.0 kV

WD: 2.0 mm

Aperture Size: 30.0 μm

Detected signal: energy-selective backscattered electron (EsB)

EsB Grid: 800V

Observation magnification: 50,000 times

Contrast: 63.0±5.0% (reference)

Brightness: 38.0±5.0% (reference)

Resolution: 1024×768

Pretreatment: Toner particles are dispersed on a carbon tape (no depositing).

The accelerating voltage and EsB Grid are set to acquire structural information on the outermost surface of a toner particle, to prevent or suppress charge-up of an undeposited specimen, to selectively detect high-energy backscattered electrons, and the like. The observation field is selected near the top where the toner particle has the smallest curvature. A bright portion of the backscattered electron image derived from the organosilicon polymer was confirmed by superimposing an element mapping image acquired by energy dispersive X-ray analysis (EDS) with a scanning electron microscope (SEM) on the backscattered electron image.

The SEM/EDS apparatus and observation conditions are as follows:

Apparatus used (SEM): ULTRA PLUS manufactured by Carl Zeiss Microscopy GmbH

Apparatus used (EDS): NORAN System 7, Ultra Dry EDS Detector manufactured by Thermo Fisher Scientific Inc.

Accelerating voltage: 5.0 kV

WD: 7.0 mm

Aperture Size: 30.0 μm

Detected signal: SE2 (secondary electron)

Observation magnification: 50,000 times

Mode: Spectral Imaging

Pretreatment: Toner particles are dispersed on a carbon tape, and platinum is sputtered.

A mapping image of silicon element acquired by this method is superimposed on the backscattered electron image to confirm that a silicon atom portion of the mapping image matches the bright portion of the backscattered electron image.

The area percentage of the bright portion area to the total area of the backscattered electron image was calculated by analyzing the backscattered electron image of the surface of the toner particle acquired by the above method using image-processing software ImageJ (developed by Wayne Rashand). The procedure is described below.

First, a backscattered electron image is converted to 8-bit using Type of the Image menu. Using Filters of the Process menu, the Median size is then set to 2.0 pixels to reduce image noise. The center of the image is estimated after removing an observation condition display section displayed in a lower portion of the backscattered electron image, and a 1.5-μm square range around the center of the backscattered electron image is selected using Rectangle Tool on the toolbar. Then select Threshold from Adjust on the Image menu. Select Default, click Auto, and then click Apply to acquire a binarized image. A bright portion of the backscattered electron image is displayed in white by this operation. The center of the image is estimated again after removing an observation condition display section displayed in a lower portion of the backscattered electron image, and a 1.5-μm square range around the center of the backscattered electron image is selected using Rectangle Tool on the toolbar. Then select Histogram from the Analyze menu. Read a Count value from a newly opened Histogram window (corresponds to the total area of the backscattered electron image). Click List to read the Count value at brightness 0 (corresponding to the bright portion area of the backscattered electron image). From these values, the area percentage of the bright portion area to the total area of the backscattered electron image is calculated. This procedure is performed in 10 fields of a toner particle to be evaluated to calculate the number average and obtain the area percentage (%) of the bright portion area of an image binarized such that the organosilicon polymer portion in the backscattered electron image becomes the bright portion to the total area of the image.

Method for Identifying Organosilicon Polymer

A method for identifying an organosilicon polymer is performed by a combination of scanning electron microscope (SEM) observation and elemental analysis using energy dispersive X-ray analysis (EDS).

Toner is observed in a field magnified up to 50,000 times with a scanning electron microscope "Hitachi ultrahigh resolution field-emission scanning electron microscope S-4800" (Hitachi High-Technologies Corporation) The surface of a toner particle is focused and observed. Particles and the like on the surface are subjected to EDS analysis to determine whether the analyzed particles and the like are formed of an organosilicon polymer from the presence or absence of a Si element peak. When both an organosilicon polymer and fine silica particles are present on the surface of a toner particle, the organosilicon polymer is identified by comparing the ratio of the Si element content (atomic %) to the O element content (atomic %) (Si/O ratio) with that of an authentic sample. EDS analysis is performed on each authentic sample of the organosilicon polymer and the fine silica particles under the same conditions to determine the Si and O element contents (atomic %). The Si/O ratio of the organosilicon polymer is denoted by A, and the Si/O ratio of the fine silica particles is denoted by B. Measurement conditions under which A is significantly larger than B are selected. More specifically, an authentic sample is measured 10 times under the same conditions to obtain the arithmetic mean values of A and B. Measurement conditions under which the mean values satisfy $A/B>1.1$ are selected. When the Si/O ratio of a particle or the like to be identified is closer to A than $[(A+B)/2]$, the particle or the like is judged to be an organosilicon polymer.

An authentic sample of organosilicon polymer particles is Tospearl 120A (Momentive Performance Materials Japan LLC). An authentic sample of fine silica particles is HDK V15 (Asahi Kasei Corporation).

Method for Measuring Number-Average Particle Diameter R of Primary Particles of External Additive The scanning electron microscope "Hitachi ultrahigh resolution field-emission scanning electron microscope S-4800" (Hitachi High-Technologies Corporation) and elemental analysis using energy dispersive X-ray analysis (EDS) are combined.

The elemental analysis method using EDS is also used to randomly photograph an external additive particle in a field magnified up to 50,000 times. One hundred external additive particles are randomly selected from a captured image. The long diameters of primary particles of the external additive particles to be measured are measured, and the arithmetic mean thereof is defined as a number-average particle diameter R. The observation magnification is appropriately adjusted for the size of the external additive particles.

Method for Determining Composition and Ratio of Constituent Compounds of Organosilicon Polymer The composition and ratio of constituent compounds of an organosilicon polymer in toner is determined by NMR. Toner containing an external additive, such as fine silica particles, in addition to an organosilicon polymer is subjected to the following operation.

One gram of toner is dissolved and dispersed in 31 g of chloroform in a vial. An ultrasonic homogenizer is used for the dispersion for 30 minutes to prepare a dispersion liquid.

Sonicator: ultrasonic homogenizer VP-050 (manufactured by Taitec Corporation)

Microtip: step-type microtip, tip diameter Φ 2 mm

Tip position of microtip: at the center of a glass vial and 5 mm above the bottom of the vial Ultrasonic conditions: intensity 30%, 30 minutes Ultrasonic waves are applied while the vial is cooled with ice water to prevent an increase in the temperature of the dispersion liquid. The dispersion liquid is transferred to a glass tube for a swing rotor (50 mL) and is centrifuged in the centrifugal separator (H-9R manufactured by Kokusan Co., Ltd.) at 58.33 $s^{-1}$ for 30 minutes. In the glass tube after the centrifugation, the lower layer contains particles with a high specific gravity, for example, fine silica particles. A chloroform solution containing the organosilicon polymer in the upper layer is collected, and the chloroform is removed by vacuum drying (40° C./24 hours) to prepare a sample. Using the sample or the organosilicon polymer, the abundance ratio of the constituent compounds of the organosilicon polymer and the proportion of a T3 unit structure represented by $R—Si(O_{1/2})_3$ in the organosilicon polymer are measured and calculated by solid-state 29Si-NMR.

First, a hydrocarbon group represented by R is identified by 13C-NMR.

Measurement Conditions for 13C-NMR (Solid-State

Apparatus: JNM-ECX500II manufactured by JEOL RESONANCE

Specimen tube: 3.2 mmΦ

Specimen: sample or organosilicon polymer

Measurement temperature: room temperature

Pulse mode: CP/MAS

Measurement nuclear frequency: 123.25 MHz (13C)

Reference substance: adamantane (external standard: 29.5 ppm)

Specimen rotation speed: 20 kHz

Contact time: 2 ms

Delay time: 2 s

Number of scans: 1024

In the method, the hydrocarbon group represented by R is identified by the presence or absence of a signal attributed to a methyl group (Si—CH3), an ethyl group (Si—C2H5), a propyl group (Si—C3H7), a butyl group (Si—C4H9), a pentyl group (Si—C5H11), a hexyl group (Si—C6H13), a phenyl group (Si—C6H5-), or the like bonded to the silicon atom.

On the other hand, in solid-state 29Si-NMR, a peak is detected in a different shift region depending on the structure of a functional group bonded to Si of a constituent compound of the organosilicon polymer. Each peak position can be determined using a standard sample to identify the structure bonded to Si. The abundance ratio of each constituent compound can be calculated from its peak area. The ratio of the peak area of the T3 unit structure to the total peak area can be calculated.

The measurement conditions for solid-state 29Si-NMR are as follows:

Apparatus: JNM-ECX5002 (JEOL RESONANCE)

Temperature: room temperature

Measurement method: DDMAS method 29Si 45 degrees

Specimen tube: zirconia 3.2 mmΦ

Specimen: powder in test tube

Specimen rotation speed: 10 kHz

Relaxation delay: 180 s

Scan: 2000

After the measurement, a plurality of silane components with different substituents and linking groups in the sample or the organosilicon polymer are peak-separated into the following X1 structure, X2 structure, X3 structure, and X4 structure by curve fitting, and the peak areas thereof are calculated.

The X3 structure is the T3 unit structure.

X1 structure: $(Ri)(Rj)(Rk)SiO_{1/2}$ (A1)

X2 structure: $(Rg)(Rh)Si(O_{1/2})_2$ (A2)

X3 structure: $RmSi(O_{1/2})_3$ (A3)

X4 structure: $Si(O_{1/2})_4$ (A4)

X1 structure:

(A1)

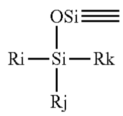

X2 structure:

(A2)

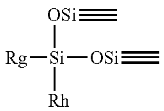

X3 structure:

(A3)

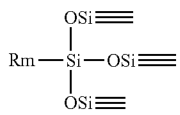

X4 structure:

(A4)

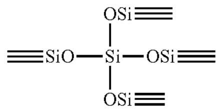

In the formulae (A1), (A2), and (A3), Ri, Rj, Rk, Rg, Rh, and Rm represent an organic group, such as a hydrocarbon group having 1 to 6 carbon atoms, a halogen atom, a hydroxy group, an acetoxy group, or an alkoxy group, bonded to silicon. To identify the structure in more detail, the structure may be identified by 1H-NMR measurement results together with the 13C-NMR and 29Si-NMR measurement results.

Method for Determining Amount of Organosilicon Polymer or Fine Silica Particles in Toner Toner is dispersed in chloroform as described above and is then centrifuged to separate an external additive, such as an organosilicon polymer or fine silica particles, according to the difference in specific gravity and prepare a sample. The external additive content, such as the organosilicon polymer content or the fine silica particle content, is determined.

In the following examples, the external additive is fine silica particles. Other fine particles can also be quantitatively determined in the same way.

First, pressed toner is subjected to fluorescent X-ray measurement and is analyzed, for example, by a calibration curve method or an FP method to determine the silicon content of the toner. The structure of each constituent compound forming the organosilicon polymer and the fine silica particles is determined by solid-state 29Si-NMR, pyrolysis GC/MS, or the like, and the silicon content of the organosilicon polymer and the fine silica particles is determined. The organosilicon polymer content and the fine silica particle content of the toner are calculated from the relationship between the silicon content of the toner determined using fluorescent X-rays and the silicon content of the organosilicon polymer and the fine silica particles determined by solid-state 29Si-NMR and pyrolysis GC/MS.

Method for Measuring Adhesion Rate of External Additive, Such as Organosilicon Polymer or Fine Silica Particle, to Toner Base Particle 63 or Toner Particle by Water Washing Method Water Washing Step 20 g of "Contaminon N" (a 30% by mass aqueous neutral detergent for cleaning precision measuring instruments composed of a nonionic surfactant, an anionic surfactant, and an organic builder, pH 7) is weighed in a 50-mL vial and is mixed with 1 g of toner. The vial is shaken using a "KM Shaker" (model: V.SX) manufactured by Iwaki Co., Ltd. at a speed of 50 for 120 seconds.

Depending on the adhesion state of the organosilicon polymer or the fine silica particles, the external additive, such as the organosilicon polymer or the fine silica particles, is transferred from the surface of the toner base particles 63 or toner particles to the dispersion liquid. The toner is separated with the centrifugal separator (H-9R manufactured by Kokusan Co., Ltd.) (at 16.67 $s^{-1}$ for 5 minutes) from the external additive, such as the organosilicon polymer or the fine silica particles, that has moved to the supernatant liquid. Precipitated toner is dried under vacuum to dryness (40° C./24 hours) and is washed with water to prepare toner.

The toner not subjected to the water washing step (toner before water washing) and the toner subjected to the water washing step (toner after water washing) are then photographed with the Hitachi ultrahigh resolution field-emission scanning electron microscope S-4800 (Hitachi High-Technologies Corporation).

An object to be measured is identified by elemental analysis using energy dispersive X-ray analysis (EDS).

A captured toner surface image is then analyzed using image analysis software Image-Pro Plus ver. 5.0 (Nippon Roper, K.K.) to calculate the coverage.

The image capturing conditions for the S-4800 are as follows:

(1) Specimen Preparation

A conductive paste is thinly applied to a specimen stage (aluminum specimen stage 15 mm×6 mm) and is sprayed with toner. Excess toner is removed from the specimen stage by air blowing. The conductive paste is thoroughly dried. The specimen stage is placed in a specimen holder. The specimen stage height is adjusted to 36 mm using a specimen height gage.

(2) Observation Condition Setting for S-4800

To measure the coverage, the elemental analysis by energy dispersive X-ray analysis (EDS) described above is performed in advance to distinguish the external additive, such as the organosilicon polymer or the fine silica particles, on the toner surface in the measurement. An anti-contamination trap attached to the housing of the S-4800 overflowing with liquid nitrogen is left for 30 minutes. Actuate "PC-SEM" of the S-4800, and perform flushing (cleaning of an electron source FE chip). Click an accelerating voltage indication of a control panel on the screen, and press a [flushing] button to open a flushing dialog. Confirm that the flushing intensity is 2, and perform flushing. Confirm that the emission current by flushing ranges from 20 to 40 μA. Insert the sample holder into a sample chamber in the S-4800 housing. Press a [Starting point] on the control panel to move the sample holder to the observation position.

Click the accelerating voltage indication to open an HV setting dialog, and set the accelerating voltage at [1.1 kV] and the emission electric current at [20 μA]. In a [Basis] tab on the operation panel, set the signal selection at [SE], select [Up (U)] and [+BSE] for an SE detector, and select [L.A.100] in a selection box on the right side of [+BSE] to adopt a backscattered electron image observation mode. In the same [Basis] tab on the operation panel, set the probe current of the electron optical system condition block at [Normal], and set the focal point mode at [UHR] and WD at [4.5 mm]. Press an [ON] button of the accelerating voltage indication on the control panel to apply the accelerating voltage.

(3) Calculation of Number-Average Particle Diameter (D1) of Toner

Drag a magnification indication on the control panel to set the magnification at 5000 (5 k) times. Rotate a focus knob [COARSE] on the operation panel to adjust the focus to some extent, and adjust the aperture alignment. Click an [Align] on the control panel to display an alignment dialog, and select [Beam]. Rotate STIGMA/ALIGNMENT knobs (X, Y) on the operation panel to move an indicated beam to the center of concentric circles. Then select an [Aperture], and rotate each of the STIGMA/ALIGNMENT knobs (X, Y) to stop or minimize the movement of an image. Close the aperture dialog, and adjust the focus by autofocusing. This operation is repeated twice to adjust the focus.

The particle diameter of 300 toner particles is then measured to determine the number-average particle diameter (D1). The particle diameter of each particle is the maximum diameter observed in the toner particle.

(4) Focus Adjustment

For particles with the number-average particle diameter (D1) determined in (3)±0.1 μm, while the midpoint of the maximum diameter is matched to the center of the measurement screen, drag the magnification indication on the control panel to set the magnification at 10000 (10 k) times.

Rotate a focus knob [COARSE] on the operation panel to adjust the focus to some extent, and adjust the aperture alignment. Click an [Align] on the control panel to display an alignment dialog, and select [Beam]. Rotate STIGMA/ALIGNMENT knobs (X, Y) on the operation panel to move an indicated beam to the center of concentric circles. Then select an [Aperture], and rotate each of the STIGMA/ALIGNMENT knobs (X, Y) to stop or minimize the movement of an image. Close the aperture dialog, and adjust the focus by autofocusing. Subsequently, set the magnification at 50,000 (50 k) times, perform focus adjustment with the focus knob and the STIGMA/ALIGNMENT knobs in the same manner as described above, and adjust the focus again by autofocusing. This operation is repeated to adjust the focus. The accuracy of measurement of the coverage tends to decrease with the increasing tilt angle of the observation surface. Thus, the observation surface is selected such that the focus can be entirely adjusted at a time in focus adjustment, and a surface with a minimum tilt is selected and analyzed.

(5) Image Storage

Adjust brightness in an ABC mode, and take and store a photograph with a size of 640×480 pixels. Use this image file to perform the following analysis. Take a photograph for each toner to acquire an image of toner particles.

(6) Image Analysis

The image thus acquired is binarized using the following analysis software to calculate the coverage. One screen is divided into 12 squares, which are individually analyzed. The analysis conditions of the image analysis software Image-Pro Plus ver. 5.0 are described below. If any of the squares contains an external additive, such as an organosilicon polymer with a particle diameter of less than 30 nm and more than 300 nm or fine silica particles with a particle diameter of less than 30 nm and more than 1200 nm, the coverage is not calculated in the square.

In the image analysis software Image-Pro Plus ver. 5.0, select "Count/Size" and then "Option" from "Measurement" on the toolbar, and set the binarization conditions. Select 8 coupling in the object extraction option, and set the smoothing to 0. In addition, do not select pre-selection, filling hole, and comprehensive line, and set "Exclude Borderline" to "None". Select "Measurement Item" from "Measurement" on the toolbar, and input 2 to 107 in the area selection range.

The coverage is calculated around a square region. Select the area (C) of the region in the range of 24,000 to 26,000 pixels. "Processing"-Perform automatic binarization for binarization, and calculate the sum (D) of the areas of regions without the external additive, such as the organosilicon polymer or the fine silica particles.

The coverage can be obtained using the following formula from the area C of the square region and the sum D of the areas of the regions without the external additive, such as the organosilicon polymer or the fine silica particles.

$$\text{Coverage (\%)} = 100 - (D/C \times 100)$$

The arithmetic mean of all the data is defined as the coverage.

The coverages with the toner before water washing and with the toner after water washing are calculated, and [coverage with toner after water washing]/[coverage with toner before water washing]×100 is defined as the "adhesion rate" in the present disclosure.

4. Method for Producing Toner Particles, External Additive, and Developer

Next, production examples of the toner particles, the external additive A, and the developer of the present exemplary embodiment are described below.

Production Example of Toner Particles

Preparation of Aqueous Medium 1

A reaction vessel equipped with a stirrer, a thermometer, and a reflux tube was charged with 650.0 parts of ion-exchanged water and 14.0 parts of sodium phosphate (dodecahydrate, manufactured by Rasa Industries, Ltd.) and was kept warm at 65° C. for 1.0 hour while being purged with nitrogen. While the mixture was stirred at 15,000 rpm with a T.K. homomixer (manufactured by Tokushu Kika Kogyo Co., Ltd.), an aqueous calcium chloride containing 9.2 parts of calcium chloride (dihydrate) dissolved in 10.0 parts of ion-exchanged water was added at once to the mixture to prepare an aqueous medium containing a dispersion stabilizer. Furthermore, 10% by mass hydrochloric acid was added to the aqueous medium to adjust the pH to 5.0, thereby preparing an aqueous medium 1.

Preparation of Polymerizable Monomer Composition

Styrene: 60.0 parts

C.I. Pigment Blue 15:3: 6.5 parts

These materials were charged into an attritor (manufactured by Mitsui Miike Machinery Co., Ltd.) and were dispersed using zirconia particles with a diameter of 1.7 mm at 220 rpm for 5.0 hours. The zirconia particles were then removed to prepare a colorant dispersion liquid.

Styrene: 20.0 parts n-butyl acrylate: 20.0 parts

Crosslinking agent (divinylbenzene): 0.3 parts

Saturated polyester resin: 5.0 parts (a polycondensate of propylene-oxide-modified bisphenol A (2-mol adduct) and terephthalic acid (mole ratio 10:12), glass transition temperature (Tg): 68° C., weight-average molecular weight (Mw): 10,000, molecular weight distribution (Mw/Mn): 5.12)

Fischer-Tropsch wax (melting point 78° C.): 7.0 parts

These materials were added to the colorant dispersion liquid, were heated to 65° C., and were uniformly dissolved and dispersed at 500 rpm with the T.K. homomixer (manufactured by Tokushu Kika Kogyo Co., Ltd.) to prepare a polymerizable monomer composition.

Granulation Step

The temperature of the aqueous medium 1 was adjusted to 70° C. The polymerizable monomer composition was added to the aqueous medium 1 while maintaining the rotation speed of the T.K. homomixer at 15,000 rpm, and 10.0 parts of a polymerization initiator t-butyl peroxypivalate was added thereto. The mixture was granulated for 10 minutes while maintaining the mixer at 15,000 rpm.

Polymerization Step and Distillation Step

After the granulation step, the stirrer was replaced with a propeller impeller blade, and polymerization was performed at 70° C. for 5.0 hours and then at 85° C. for 2.0 hours with stirring at 150 rpm. The reflux tube of the reaction vessel was then replaced with a cooling tube, and the resulting slurry was heated to 100° C. for distillation for 6 hours to evaporate the unreacted polymerizable monomer, thereby preparing a resin particle dispersion liquid.

Step of Forming Organosilicon Polymer

A reaction vessel equipped with a stirrer and a thermometer was charged with 60.0 parts of ion-exchanged water, and the pH was adjusted to 4.0 using 10% by mass hydrochloric acid. The ion-exchanged water was heated with stirring to a temperature of 40° C. 40.0 parts of an organosilicon compound methyltriethoxysilane was added to the ion-exchanged water, which was then stirred for 2 hours or more for hydrolysis. The endpoint of the hydrolysis was visually confirmed when oil and water did not separate and formed a single layer. The product was cooled to prepare a hydrolysate of the organosilicon compound.

The temperature of the resin particle dispersion liquid was adjusted to 55° C., and 25.0 parts of the hydrolysate of the organosilicon compound (the amount of the organosilicon compound added was 10.0 parts) was then added to initiate polymerization of the organosilicon compound. The liquid was kept for 0.25 hours and was then adjusted to pH 5.5 with 3.0% aqueous sodium hydrogen carbonate. The liquid was kept for 1.0 hour with stirring at 55° C. (condensation reaction 1), was then adjusted to pH 9.5 with 3.0% aqueous sodium hydrogen carbonate, and was kept for another 4.0 hours (condensation reaction 2) to prepare a toner-particle dispersion liquid.

Washing Step and Drying Step

After completion of the step of forming the organosilicon polymer, the toner-particle dispersion liquid was cooled, was adjust to pH 1.5 or less with hydrochloric acid, and was left for 1.0 hour with stirring. Solid-liquid separation was then performed with a pressure filter to prepare a toner cake. The toner cake was reslurried with ion-exchanged water to prepare a dispersion liquid again, which was then subjected to solid-liquid separation with the filter to prepare a toner cake. The toner cake was transferred to a constant temperature bath at 40° C. and was dried and classified for 72 hours to prepare toner particles.

5. Effects of Present Exemplary Embodiment

An effect confirmatory experiment to confirm the effects of the present exemplary embodiment is described below.

First, the image-forming apparatus 100 is used to form a 50-mm square process black toner image at a loading of 320% on the intermediate transfer belt 10. More specifically, a 50-mm square toner image formed of a yellow toner at a loading of 80% is primarily transferred onto the intermediate transfer belt 10. Subsequently, 50-mm square toner images formed of magenta, cyan, and black toners at a loading of 80% are sequentially primarily transferred onto the intermediate transfer belt 10. Immediately after completion of the secondary transfer of the process black toner image thus formed, the image-forming apparatus 100 is deactivated. The amount of secondary-transfer remaining toner was examined in a process black toner image portion remaining on the surface of the intermediate transfer belt 10. In the present exemplary embodiment, the loading of a solid black image of a single color (FF tone) is taken to be 100%.

The amount of secondary-transfer remaining toner was measured by the following method. First, the secondary-transfer remaining toner of the process black toner image on the intermediate transfer belt 10 was sucked with a vacuum cleaner through a filter with a finer mesh than the toner to collect the secondary-transfer remaining toner on the filter. The weight of the filter was then measured, and the increase from the initial weight was determined as the amount of secondary-transfer remaining toner. When the amount of secondary-transfer remaining toner is 0.01 $mg/cm^2$ or less, it can be judged that there is almost no secondary-transfer remaining toner. When the amount of secondary-transfer remaining toner is 0.05 $mg/cm^2$ or less, no visible adverse effect in an image, such as a decrease in image density, occurs. A value of more than 0.05 $mg/cm^2$ and 0.10 $mg/cm^2$ or less results in a visible adverse effect in an image, such as a slight decrease in image density, but no problem in an actual image. On the other hand, a value of more than 0.10 $mg/cm^2$ results in a visible adverse effect in an image, such as a low image density.

The amount of secondary-transfer remaining toner was determined in two cases: the case where all color toners have an initial durability state (the number of printed sheets ranges from 0 to 50) and the case where only a yellow toner is printed on 5000 sheets, and cyan, magenta, and black toners have an initial state.

Finally, the results of the effect confirmatory experiment of the present exemplary embodiment are described below.

Exemplary Embodiment 1-a

The number averages H1 and H2 of the protrusion heights H of toner used in Exemplary Embodiment 1-a are described below. The number averages H1 and H2 were 60 nm in a yellow toner in the first image-forming station a, a magenta toner in the second image-forming station b, and a cyan toner in the third image-forming station c, and 15 nm in a black toner in the fourth image-forming station d. Table 1 shows the measurement results of the amount of secondary-transfer remaining toner.

Exemplary Embodiment 1-b

Exemplary Embodiment 1-b was the same as Exemplary Embodiment 1-a except that the black toner has a protrusion height H of 15 nm. Table 1 shows the measurement results of the amount of secondary-transfer remaining toner.

Exemplary Embodiment 1-c

Exemplary Embodiment 1-c was the same as Exemplary Embodiment 1-a except that the black toner has a protrusion height H of 55 nm. Table 1 shows the measurement results of the amount of secondary-transfer remaining toner.

Exemplary Embodiment 1-d

Exemplary Embodiment 1-d was the same as Exemplary Embodiment 1-a except that the yellow toner had an adhesion rate of 85%. Table 1 shows the measurement results of the amount of secondary-transfer remaining toner.

Comparative Example 1

Comparative Example 1 was the same as Exemplary Embodiment 1-a except that the black toner has a protrusion height H of 60 nm. Table 1 shows the measurement results of the amount of secondary-transfer remaining toner.

Comparative Example 2

Comparative Example 2 was the same as Exemplary Embodiment 1-a except that the yellow toner had an adhesion rate of 62%. Table 1 shows the measurement results of the amount of secondary-transfer remaining toner.

TABLE 1

| | Number average H1 of protrusion heights H of yellow toner | Number average H2 of protrusion heights H of black toner | Adhesion rate of yellow toner | Secondary-transfer remaining toner (initial) | Secondary-transfer remaining toner (yellow: after printing 5000 sheets; cyan, magenta, and black: initial) |
|---|---|---|---|---|---|
| Exemplary embodiment 1-a | 60 nm | 10 nm | 98% | 0.01 $mg/cm^2$ | 0.01 $mg/cm^2$ |
| Exemplary embodiment 1-b | 60 nm | 50 nm | 98% | 0.03 $mg/cm^2$ | 0.03 $mg/cm^2$ |
| Exemplary embodiment 1-c | 60 nm | 55 nm | 98% | 0.09 $mg/cm^2$ | 0.09 $mg/cm^2$ |
| Exemplary embodiment 1-d | 60 nm | 10 nm | 85% | 0.01 $mg/cm^2$ | 0.05 $mg/cm^2$ |
| Comparative example 1 | 60 nm | 60 nm | 98% | 0.11 $mg/cm^2$ | 0.11 $mg/cm^2$ |
| Comparative example 2 | 60 nm | 10 nm | 62% | 0.01 $mg/cm^2$ | 0.23 $mg/cm^2$ |

As shown in Table 1, Exemplary Embodiments 1-a to 1-d can maintain high secondary transferability regardless of the durability state of the toner.

In particular, Exemplary Embodiments 1-a and 1-b can maintain high secondary transferability throughout the long-term use. This is because the number average H2 of the protrusion heights H of the black toner provided downstream of the yellow image-forming portion is smaller than the number average H1 of the protrusion heights H of the yellow toner provided upstream of the black image-forming portion. In other words, it is achieved by making the number average H1 of the protrusion heights H of the first toner to be primarily transferred larger than the number average H2 of the protrusion heights H of the last toner to be primarily transferred. Furthermore, the yellow toner has an adhesion rate of 98%, and the protrusions of the toner particles are maintained on the surface of the toner particles throughout the long-term use. Thus, the secondary transferability is maintained.

In Exemplary Embodiment 1-c, the number average H2 of the protrusion heights H of the black toner was smaller than the number average H1 of the protrusion heights H of the yellow toner. Thus, although the difference was small and the secondary transferability was slightly lower than those of Exemplary Embodiments 1-a and 1-b, an output image had no practical problems.

In Exemplary Embodiment 1-d, the yellow toner had an adhesion rate of 85%, and the protrusions of the toner particles were maintained on the surface of the toner particles throughout the long-term use. Although the adhesion rate was slightly lower than those of Exemplary Embodiments 1-a and 1-b, and the secondary transferability was slightly lower than those of Exemplary Embodiments 1-a and 1-b, an output image had no practical problems.

In Comparative Example 1, the number average H1 of the protrusion heights H of the yellow toner was the same as the number average H2 of the protrusion heights H of the black toner. Thus, the secondary transferability was lower than that of Exemplary Embodiment 1, and an adverse effect in an image occurred. In Comparative Example 2, the yellow toner had an adhesion rate of 62%, and the protrusions of the toner particles could not be maintained on the surface of the toner particles throughout the long-term use. Thus, the secondary transferability was reduced after the long-term use.

Exemplary Embodiment 1 is an image-forming apparatus with the following features.

The image-forming apparatus includes a first image-forming portion, which includes a rotatable first photosensitive drum 1 and a rotatable first development roller 41 that can bear a first developer composed of a first toner particle and an organosilicon protrusion 64 formed on the surface of the first toner particle. The first development roller 41 comes into contact with the first photosensitive drum 1, forms a first developing portion, and supplies the first developer to the surface of the first photosensitive drum 1 to form a first developer image in the first developing portion.

The image-forming apparatus includes a second image-forming portion, which includes a rotatable second photosensitive drum 1 and a rotatable second development roller 41 that can bear a second developer composed of a second toner particle and an organosilicon protrusion 64 formed on the surface of the second toner particle. The second development roller 41 comes into contact with the second photosensitive drum 1, forms a second developing portion, and supplies the second developer to the surface of the second photosensitive drum 1 to form a second developer image in the second developing portion.

The image-forming apparatus includes an intermediate transfer member 10 that comes into contact with the first photosensitive drum 1 and forms a first contact portion and that comes into contact with the second photosensitive drum 1 and forms a second contact portion. The first developer image is transferred to the intermediate transfer member 10 in the first contact portion, and the second developer image is transferred to the intermediate transfer member 10 in the second contact portion.

The image-forming apparatus includes a secondary transfer roller 15 that comes into contact with the intermediate transfer member 10 and forms a transfer portion and that transfers the first developer image and the second developer image formed on the surface of the intermediate transfer member 10 to a recording material P in the transfer portion.

The surface of the intermediate transfer member 10 is movable. The first image-forming portion and the second image-forming portion are arranged such that the first contact portion is formed downstream of the transfer portion and upstream of the second contact portion in the movement direction of the surface of the intermediate transfer member 10. The protrusion 64 of the second developer has a lower height than the protrusion 64 of the first developer.

The height of the protrusion 64 is represented by the height from the surface of the toner particle to the top of the protrusion 64. The height of the protrusion 64 is defined as described below in a cross-sectional image of a toner particle observed with a scanning transmission electron microscope. The cross-sectional image is converted to a horizontal image on the basis of a line along the peripheral surface of the toner particle. The height of the protrusion 64 is a maximum length of the protrusion 64 normal to the line along the peripheral surface in a portion where the protrusion 64 and the toner particle form a continuous interface in the horizontal image. The height of the protrusion 64 is calculated from the number average in the protrusions 64 formed on the toner particle.

High secondary transferability could be maintained for extended periods by making the number average H1 of the protrusion heights H of the first toner to be primarily transferred larger than the number average H2 of the protrusion heights H of the last toner to be primarily transferred and by increasing the adhesion rate of the first toner to be primarily transferred to 85% or more.

In the present exemplary embodiment, toner in a downstream image-forming station is the same as that of Exemplary Embodiment 1 except that the toner does not have a protrusion containing an organosilicon polymer on the surface of the toner base particle and only an external additive is added to the toner. More specifically, only the black toner of the fourth image-forming station d does not have a protrusion containing an organosilicon polymer on the surface of the toner base particle and contains fine silica particles as an external additive. The spacer effect during the transfer of toner having no protrusion and containing an external additive depends on the number-average particle diameter R of the primary particles of the external additive. This is because a secondary aggregated external additive interposed between a transfer member and the toner base surface is broken into primary particles by transfer pressure during the transfer. Thus, in secondary transfer of two or more color toners, the number average H1 of the protrusion heights H of the first toner to be primarily transferred onto the intermediate transfer belt 10 is larger, preferably by 5 nm or more, preferably by 10 nm or more, than the number-average particle diameter R of the primary particles of the external additive of the last toner to be primarily transferred. In the present exemplary embodiment, the ratio of the number-average particle diameter R of the primary particles of the external additive of the last toner to be primarily transferred to the number average H1 of the protrusion heights H of the first toner to be primarily transferred is preferably $0 \leq R/H1 < 1$, more preferably $0 \leq R/H1 < 0.92$, still more preferably $0 \leq R/H1 < 0.83$. As in Exemplary Embodiment 1, this can make the adhesion strength between the toner and the intermediate transfer belt 10 sufficiently lower than the adhesion strength between the toner and the recording material P and improve the secondary transferability when two or more color toners on the intermediate transfer belt 10 are secondarily transferred to the recording material P at a time.

Also in the present exemplary embodiment, the effect confirmatory experiment was performed in the same manner as in Exemplary Embodiment 1. The results are described below.

Exemplary Embodiment 2-a

The number average H1 of the protrusion heights H of toner used in Exemplary Embodiment 2-a is described below. The number averages H1 and H2 were 60 nm in a yellow toner in the first image-forming station a, a magenta toner in the second image-forming station b, and a cyan toner in the third image-forming station c, and 15 nm in a black toner in the fourth image-forming station d. Table 2 shows the measurement results of the amount of secondary-transfer remaining toner.

Exemplary Embodiment 2-b

Exemplary Embodiment 2-b was the same as Exemplary Embodiment 1-a except that the number-average particle diameter R of the primary particles of the external additive of the black toner was 15 nm. Table 2 shows the measurement results of the amount of secondary-transfer remaining toner.

Exemplary Embodiment 2-c

Exemplary Embodiment 2-c was the same as Exemplary Embodiment 1-a except that the number-average particle diameter R of the primary particles of the external additive of the black toner was 55 nm. Table 2 shows the measurement results of the amount of secondary-transfer remaining toner.

Exemplary Embodiment 2-d

Exemplary Embodiment 2-d was the same as Exemplary Embodiment 1-a except that the yellow toner had an adhesion rate of 85%. Table 2 shows the measurement results of the amount of secondary-transfer remaining toner.

Comparative Example 3

Comparative Example 3 was the same as Exemplary Embodiment 1-a except that the number-average particle diameter R of the primary particles of the external additive of the black toner was 60 nm. Table 2 shows the measurement results of the amount of secondary-transfer remaining toner.

Comparative Example 4

Comparative Example 4 was the same as Exemplary Embodiment 1-a except that the yellow toner had an adhesion rate of 62%. Table 2 shows the measurement results of the amount of secondary-transfer remaining toner.

TABLE 2

| | Number average H1 of protrusion heights H of yellow toner | Number-average particle diameter R of primary particles of external additive of black toner | Adhesion rate of yellow toner | Secondary-transfer remaining toner (initial) | Secondary-transfer remaining toner (yellow: after printing 5000 sheets; cyan, magenta, and black: initial) |
|---|---|---|---|---|---|
| Exemplary embodiment 2-a | 60 nm | 10 nm | 98% | 0.01 $mg/cm^2$ | 0.01 $mg/cm^2$ |
| Exemplary embodiment 2-b | 60 nm | 50 nm | 98% | 0.03 $mg/cm^2$ | 0.03 $mg/cm^2$ |
| Exemplary embodiment 2-c | 60 nm | 55 nm | 98% | 0.09 $mg/cm^2$ | 0.09 $mg/cm^2$ |
| Exemplary embodiment 2-d | 60 nm | 10 nm | 85% | 0.01 $mg/cm^2$ | 0.05 $mg/cm^2$ |
| Comparative example 3 | 60 nm | 60 nm | 98% | 0.11 $mg/cm^2$ | 0.11 $mg/cm^2$ |
| Comparative example 4 | 60 nm | 10 nm | 62% | 0.01 $mg/cm^2$ | 0.23 $mg/cm^2$ |

As shown in Table 2, Exemplary Embodiments 2-a to 2-d can maintain high secondary transferability regardless of the durability state of the toner.

In particular, Exemplary Embodiments 2-a and 2-b can maintain high secondary transferability throughout the long-term use. This is because the number-average particle diameter R of the primary particles of the external additive of the black toner provided downstream of the yellow image-forming portion is smaller than the number average H1 of the protrusion heights H of the yellow toner provided upstream of the black image-forming portion. In other words, it is achieved by making the number average H1 of the protrusion heights H of the first toner to be primarily transferred larger than the number-average particle diameter R of the primary particles of the external additive of the last toner to be primarily transferred. Furthermore, the yellow toner has an adhesion rate of 98%, and the protrusions of the toner particles are maintained on the surface of the toner particles throughout the long-term use. Thus, the secondary transferability is maintained.

In Exemplary Embodiment 2-c, the number-average particle diameter R of the primary particles of the external additive of the black toner was smaller than the number average H1 of the protrusion heights H of the yellow toner. Thus, although the difference was small and the secondary transferability was slightly lower than those of Exemplary Embodiments 2-a and 2-b, an output image had no practical problems.

In Exemplary Embodiment 2-d, the yellow toner had an adhesion rate of 85%, and the protrusions of the toner particles were maintained on the surface of the toner particles throughout the long-term use. Although the adhesion rate was slightly lower than those of Exemplary Embodiments 2-a and 2-b, and the secondary transferability was slightly lower than those of Exemplary Embodiments 1-a and 1-b, an output image had no practical problems.

In Comparative Example 3, the number average H1 of the protrusion heights H of the yellow toner was the same as the number-average particle diameter R of the primary particles of the external additive of the black toner. Thus, the secondary transferability was lower than that of Exemplary Embodiment 2, and an adverse effect in an image occurred. In Comparative Example 4, the yellow toner had an adhesion rate of 62%, and the protrusions of the toner particles could not be maintained on the surface of the toner particles throughout the long-term use. Thus, the secondary transferability was reduced after the long-term use.

Exemplary Embodiment 2 is an image-forming apparatus with the following features.

The image-forming apparatus includes a first image-forming portion, which includes a rotatable first photosensitive drum 1 and a rotatable first development roller 41 that can bear a first developer composed of a first toner particle and an organosilicon protrusion 64 formed on the surface of the first toner particle. The first development roller 41 comes into contact with the first photosensitive drum 1, forms a first developing portion, and supplies the first developer to the surface of the first photosensitive drum 1 to form a first developer image in the first developing portion.

The image-forming apparatus includes a second image-forming portion, which includes a rotatable second photosensitive drum 1 and a rotatable second development roller 41 that can bear a second developer containing a second toner particle and no organosilicon protrusion 64 formed on the surface of the second toner particle. The second development roller 41 comes into contact with the second photosensitive drum 1, forms a second developing portion, and supplies the second developer to the surface of the second photosensitive drum 1 to form a second developer image in the second developing portion.

The image-forming apparatus includes an intermediate transfer member 10 that comes into contact with the first photosensitive drum 1 and forms a first contact portion and that comes into contact with the second photosensitive drum 1 and forms a second contact portion. The first developer image is transferred to the intermediate transfer member 10 in the first contact portion, and the second developer image is transferred to the intermediate transfer member 10 in the second contact portion.

The image-forming apparatus includes a secondary transfer roller 15 that comes into contact with the intermediate transfer member 10 and forms a transfer portion and that transfers the first developer image and the second developer image formed on the surface of the intermediate transfer member 10 to a recording material P in the transfer portion.

The surface of the intermediate transfer member 10 is movable. The first image-forming portion and the second image-forming portion are arranged such that the first contact portion is formed downstream of the transfer portion and upstream of the second contact portion in the movement direction of the surface of the intermediate transfer member 10.

The number average H1 of the protrusion heights H of the first toner to be primarily transferred is made larger than the number-average particle diameter R of the primary particles of the external additive of the last toner to be primarily transferred. Furthermore, high secondary transferability could be maintained for extended periods when the first toner to be primarily transferred had an adhesion rate of 85% or more.

Although the present disclosure has been described with reference to specific embodiments, the present disclosure is not limited to these embodiments.

Although the relationship between the protrusion heights of the toner of the first image station a and the toner of the fourth image station d is described in the above embodiments, the combination of the image stations is not limited to those of these embodiments. For example, to improve the secondary transferability of an image in which two color toners of the second image station b and the third image station c are superimposed, the toners of these image stations may have the protrusion heights according to the present disclosure. When the toner of the lowermost stream fourth station d is superimposed on the toners of the other stations and the toners are collectively secondarily transferred, the toner of the fourth station d faces the recording material P and can have the highest adhesion strength among the toners of all the image stations. When the toner of the uppermost stream first station a is superimposed on the toners of the other stations and the toners are collectively secondarily transferred, the toner of the first station a faces the intermediate transfer belt 10 and can have the lowest adhesion strength among the toners of all the image stations.

The order of the color toners of the image-forming stations is not limited to that of the present exemplary embodiment. In the secondary transfer of a plurality of color toners, the toner in the downstream station is in direct contact with the recording material P and is less likely to become secondary-transfer remaining toner. For such a reason, as in the present exemplary embodiment, a black toner with high visibility is less likely to become secondary-transfer remaining toner when provided in the lowermost stream image-forming station. Such a structure can make the most of the advantages of the present disclosure.

Although secondary-transfer remaining toner is scraped off in the intermediate transfer belt cleaning device 17 in the present exemplary embodiment, the present disclosure is not limited thereto. For example, secondary-transfer remaining toner may be reversed in polarity with a brush or the like to which a voltage is applied in the intermediate transfer belt cleaning device 17 and may be collected with the cleaning devices 5*a*, 5*b*, 5*c*, and 5*d*, or the like. In such a structure, a large amount of secondary-transfer remaining toner may not be entirely reversed in polarity, and toner whose polarity is not reversed is not collected with the cleaning devices 5*a*, 5*b*, 5*c*, and 5*d*, or the like and is discharged onto the recording material P, causing an image defect. The present disclosure can suppress or prevent the image defect, and reversing the polarity of secondary-transfer remaining toner with a brush or the like to which a voltage is applied in the intermediate transfer belt cleaning device 17 can further provide the advantages of the present disclosure.

Figure 6:
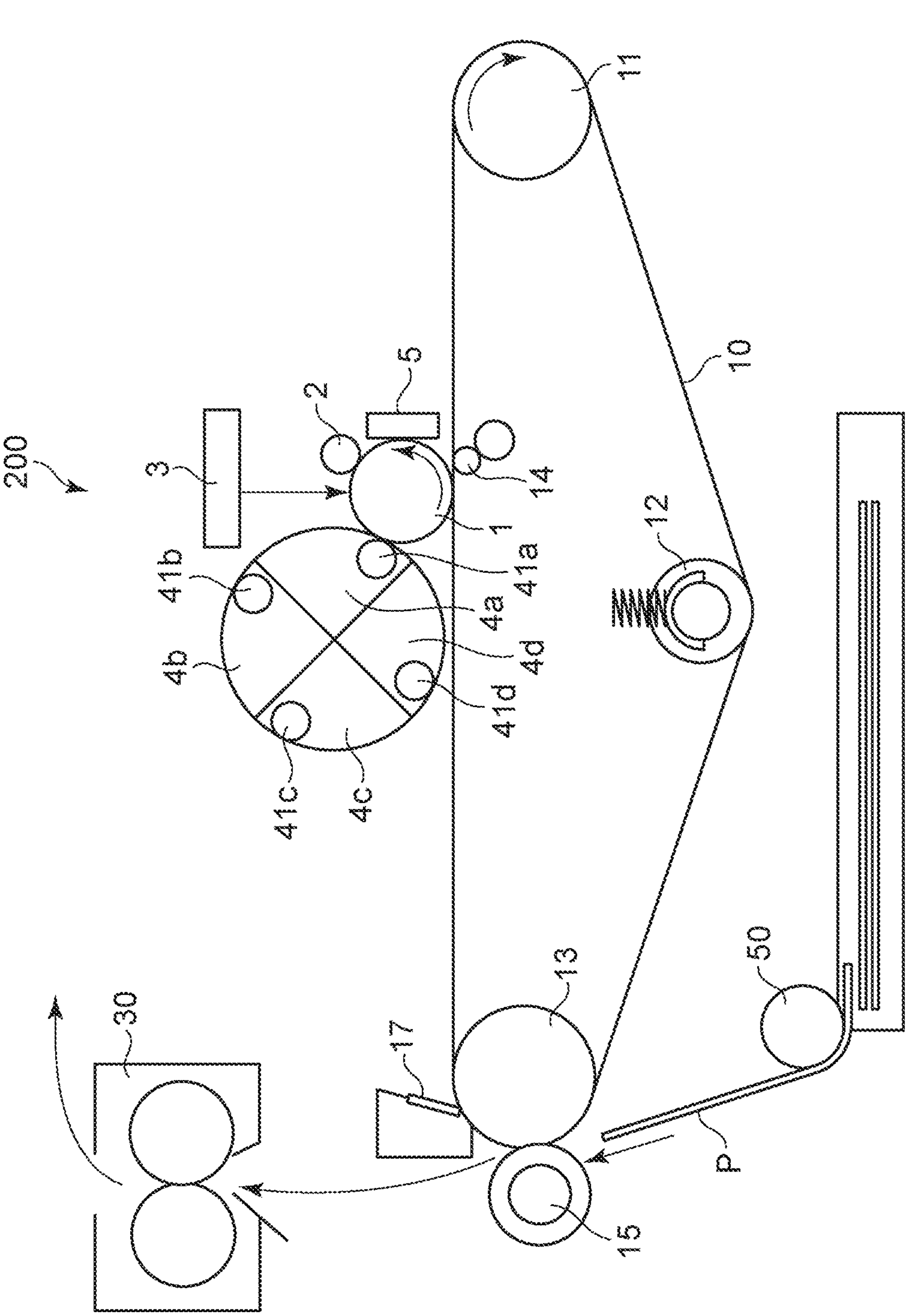
FIG. 6 is a schematic view of another image-forming apparatus according to Exemplary Embodiment 1.

Although a tandem structure including the image-forming stations a to d is described in the present exemplary embodiment, the present disclosure is not limited thereto. For example, as in an image-forming apparatus 200 illustrated in FIG. 6, development units 4*a*, 4*b*, 4*c*, and 4*d* containing their respective color toners may sequentially move to a development position and face and come into contact with the photosensitive drum 1 in one common image station. As described above, a plurality of toners may be superimposed on the intermediate transfer belt 10 by development and primary transfer. The structure illustrated in FIG. 6 includes a rotatable photosensitive drum 1 and a rotatable first development roller 41 that can bear a first developer composed of a first toner particle and an organosilicon protrusion formed on the surface of the first toner particle. The development roller 41 is located in a first development unit 4 that comes into contact with the photosensitive drum 1 and forms a first developing portion and that supplies the first developer to the surface of the photosensitive drum 1 to form a first developer image in the first developing portion. The image-forming apparatus 200 includes a rotatable second development roller 41 that can bear a second developer composed of a second toner particle and an organosilicon protrusion formed on the surface of the second toner particle. The development roller 41 is located in a second development unit 4 that comes into contact with the photosensitive drum 1 and forms a second developing portion and that supplies the second developer to the surface of the photosensitive drum 1 to form a second developer image in the second developing portion. The image-forming apparatus 200 further includes an intermediate transfer member 10 that comes into contact with the photosensitive drum 1 and forms a contact portion in which the second developer image is transferred after the first developer image. The image-forming apparatus includes a secondary transfer roller 15 that comes into contact with the intermediate transfer member 10 and forms a transfer portion and that transfers the first developer image and the second developer image formed on the surface of the intermediate transfer member 10 to a recording material in the transfer portion. The protrusion of the second developer has a lower height than the protrusion of the first developer. As in Exemplary Embodiment 2, the organosilicon protrusion on the surface of the second toner particle may not be required. Provided that the development units 4*a*, 4*b*, 4*c*, and 4*d* containing their respective color toners face and come into contact with the photosensitive drum 1 in one common image station, therefore, unlike the image-forming apparatus 200 of FIG. 6, the development units 4*a*, 4*b*, 4*c*, and 4*d* do not necessarily move sequentially.

As described above, according to the present disclosure, a plurality of color toners can maintain high secondary transferability for extended periods.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image-forming apparatus comprising:

a first image-forming portion including:

a rotatable first image-bearing member; and a rotatable first developer-bearing member configured to bear a first developer composed of a first toner particle and an organosilicon protrusion formed on a surface of the first toner particle, configured to come into contact with the first image-bearing member and form a first developing portion, and configured to supply the first developer to a surface of the first image-bearing member to form a first developer image in the first developing portion;

a second image-forming portion including:

a rotatable second image-bearing member; and a rotatable second developer-bearing member configured to bear a second developer containing a second toner particle and no organosilicon protrusion formed on a surface of the second toner particle, configured to come into contact with the second image-bearing member and form a second developing portion, and configured to supply the second developer to a surface of the second image-bearing member to form a second developer image in the second developing portion;

an intermediate transfer member configured to come into contact with the first image-bearing member and form a first contact portion and to come into contact with the second image-bearing member and form a second contact portion, wherein the first developer image is transferred to the intermediate transfer member in the first contact portion, and the second developer image is transferred to the intermediate transfer member in the second contact portion; and a transfer member configured to come into contact with the intermediate transfer member, form a transfer portion, and transfer the first developer image and the second developer image formed on a surface of the intermediate transfer member to a recording material in the transfer portion, wherein the surface of the intermediate transfer member is movable, the first image-forming portion and the second image-forming portion are arranged such that the first contact portion is formed downstream of the transfer portion and upstream of the second contact portion in a movement direction of the surface of the intermediate transfer member.

2. The image-forming apparatus according to claim 1, wherein the height of the protrusion is a height from a surface of the toner particle to a top of the protrusion.

3. The image-forming apparatus according to claim 1, wherein when a cross-sectional image of the toner particle observed with a scanning transmission electron microscope is converted to a horizontal image with reference to a line along a peripheral surface of the toner particle, the height of the protrusion is a maximum length of the protrusion normal to a line along the peripheral surface in a portion where the protrusion and the toner particle form a continuous interface in the horizontal image.

4. The image-forming apparatus according to claim 1, wherein the height of the protrusion is calculated from a number-average height of the protrusions of the toner particle.

5. The image-forming apparatus according to claim 4, wherein the second developer is a developer containing an external additive, and the protrusions of the first developer have a number-average height larger than a number-average particle diameter of primary particles of the external additive of the second developer.

6. The image-forming apparatus according to claim 5, wherein the number-average height of the protrusions of the first developer minus the number-average particle diameter of the primary particles of the external additive of the second developer is greater than or equal to 10 nm.

7. The image-forming apparatus according to claim 1, wherein the protrusion contains an organosilicon polymer represented by the following formula (1) on its surface, $$R-\mathrm{Si}(\mathrm{O}_{1/2})_3 \qquad (1)$$

wherein R denotes a hydrocarbon group having 1 to 6 carbon atoms.

8. An image-forming apparatus comprising;

a rotatable image-bearing member;

a first development unit including a rotatable first developer-bearing member configured to bear a first developer composed of a first toner particle and an organosilicon protrusion formed on a surface of the first toner particle, configured to come into contact with the image-bearing member and form a first developing portion, and configured to supply the first developer to a surface of the image-bearing member to form a first developer image in the first developing portion;

a second development unit including a rotatable second developer-bearing member configured to bear a second developer composed of a second toner particle and not composed of an organosilicon protrusion formed on a surface of the second toner particle, configured to come into contact with the image-bearing member and form a second developing portion, and configured to supply the second developer to the surface of the image-bearing member to form a second developer image in the second developing portion;

an intermediate transfer member configured to come into contact with the image-bearing member and form a contact portion, wherein the second developer image is transferred after the first developer image in the contact portion; and a transfer member configured to come into contact with the intermediate transfer member, form a transfer portion, and transfer the first developer image and the second developer image formed on a surface of the intermediate transfer member to a recording material in the transfer portion.

9. The image-forming apparatus according to claim 8, wherein the protrusion contains an organosilicon polymer represented by the following formula (1) on its surface, $$R-\mathrm{Si}(\mathrm{O}_{1/2})_3 \qquad (1)$$

wherein R denotes a hydrocarbon group having 1 to 6 carbon atoms.

* * * * *